Aug. 6, 1935.    L. F. NENNINGER ET AL    2,010,556
TRANSMISSION AND CONTROL MECHANISM FOR MILLING MACHINES
Filed Feb. 29, 1932    9 Sheets-Sheet 1

Inventors
LESTER F. NENNINGER
FRED A. HASSMAN
By H. K. Parsons
Attorney

Aug. 6, 1935.    L. F. NENNINGER ET AL    2,010,556
TRANSMISSION AND CONTROL MECHANISM FOR MILLING MACHINES
Filed Feb. 29, 1932    9 Sheets-Sheet 3
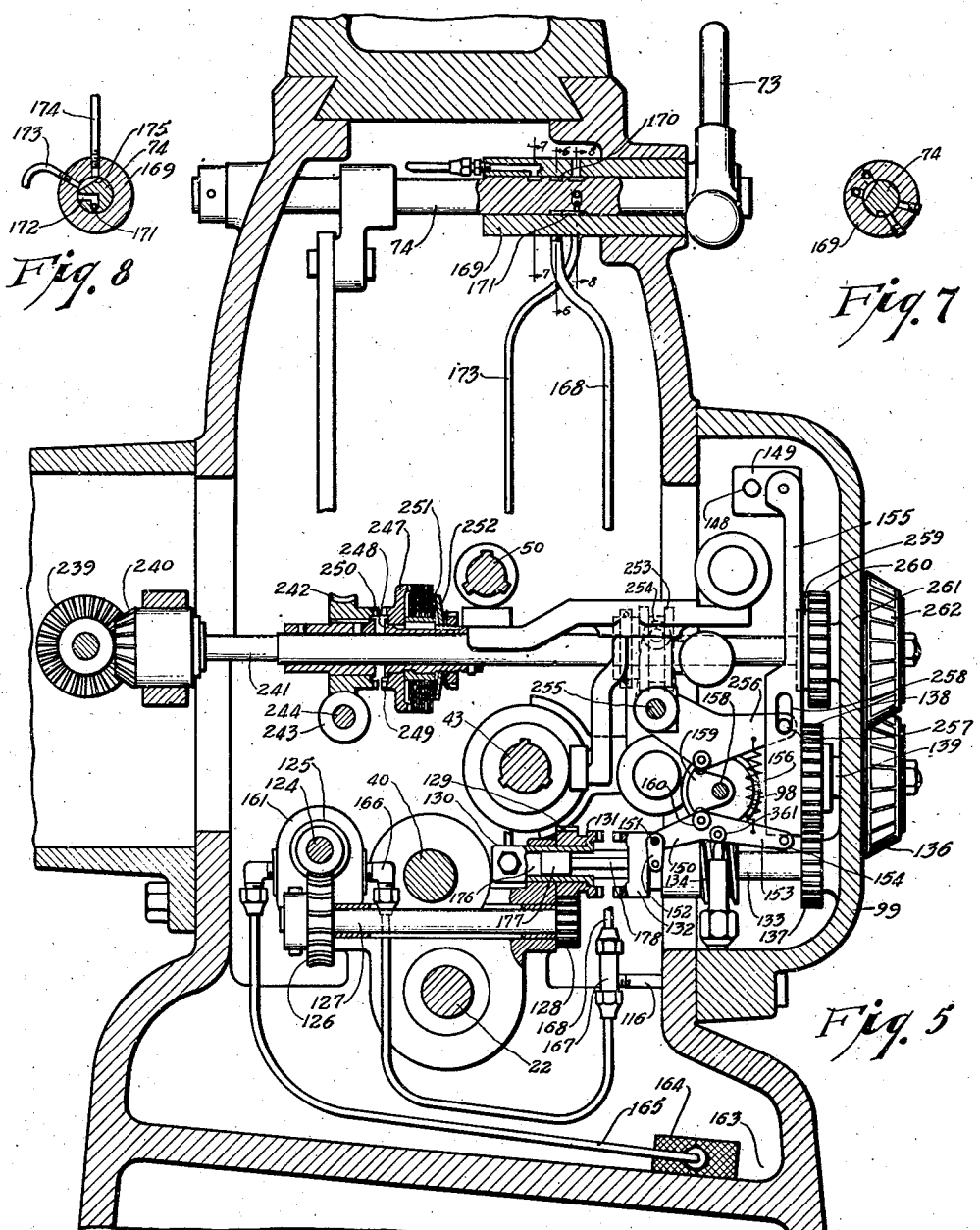
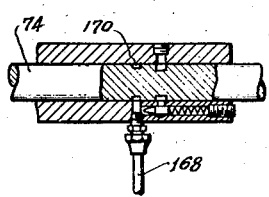
Inventors
LESTER F. NENNINGER
FRED A. HASSMAN
AHKParsons
Attorney Aug. 6, 1935.  L. F. NENNINGER ET AL  2,010,556
TRANSMISSION AND CONTROL MECHANISM FOR MILLING MACHINES
Filed Feb. 29, 1932  9 Sheets-Sheet 4

LESTER F. NENNINGER
FRED A. HASSMAN

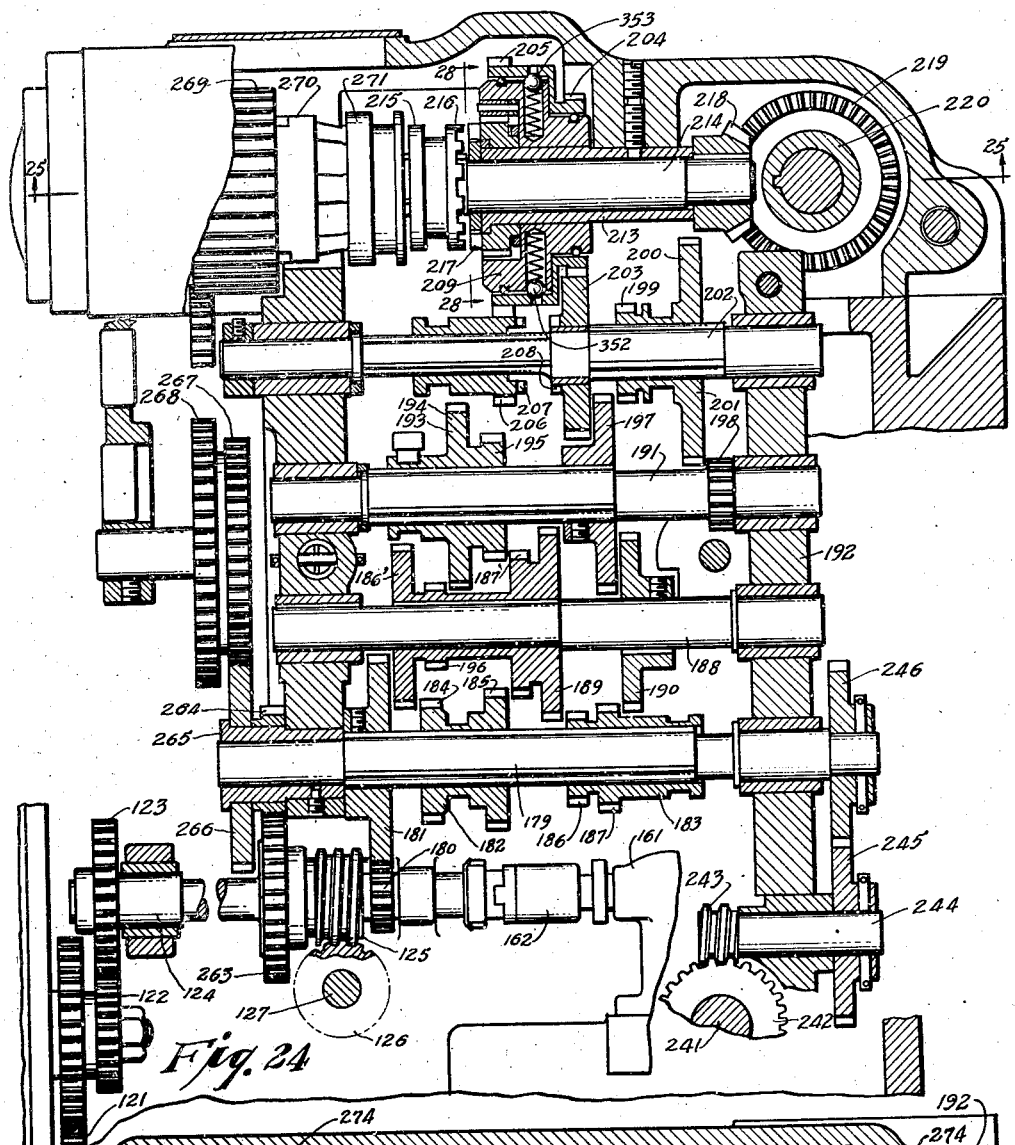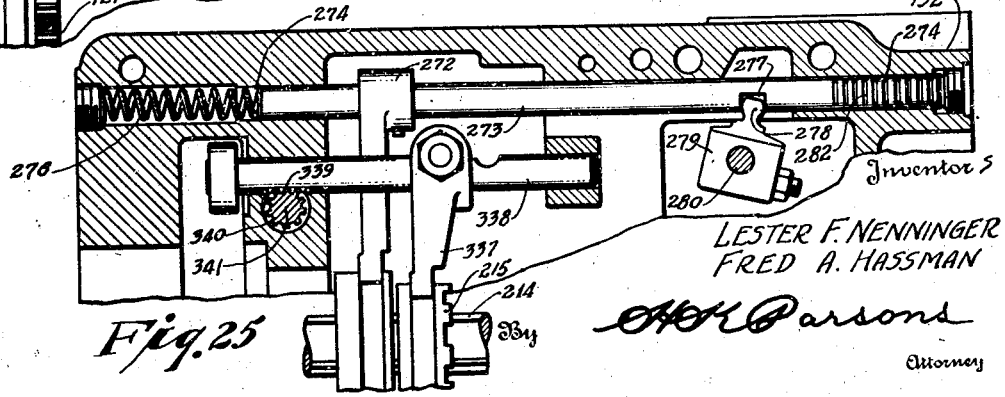

Inventors
LESTER F. NENNINGER
FRED A. HASSMAN
By
Attorney

Aug. 6, 1935. L. F. NENNINGER ET AL 2,010,556
TRANSMISSION AND CONTROL MECHANISM FOR MILLING MACHINES
Filed Feb. 29, 1932 9 Sheets-Sheet 7

Inventors
LESTER F. NENNINGER
FRED A. HASSMAN

By AHKParsons
Attorney

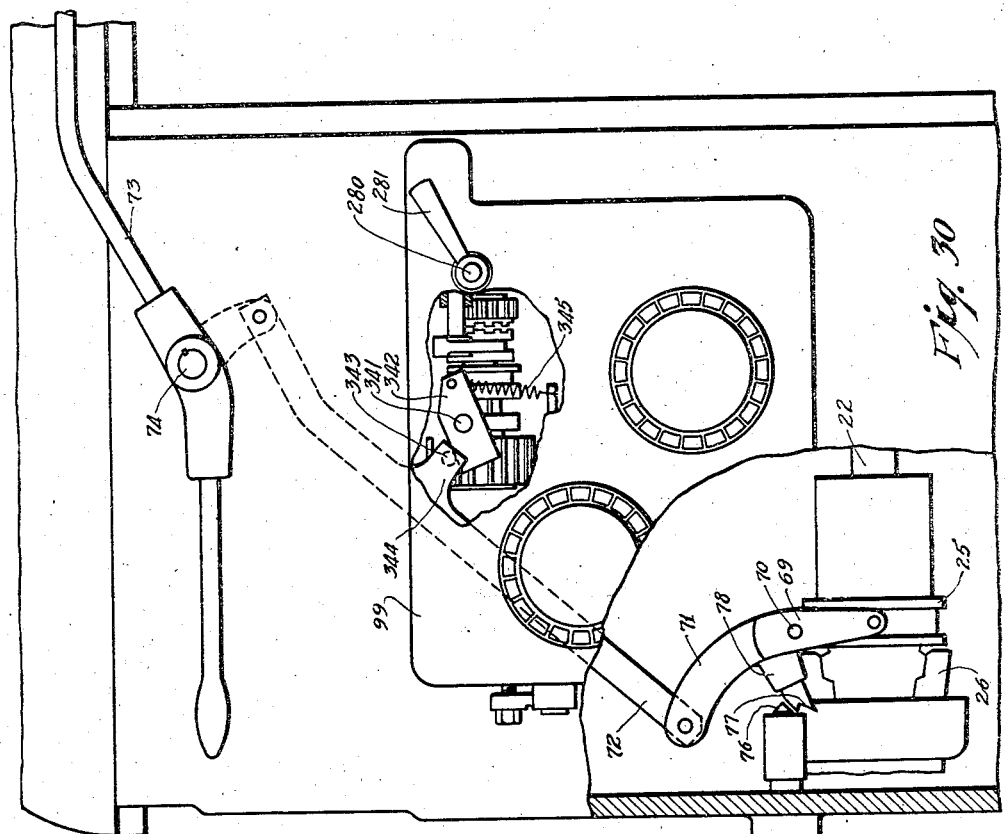
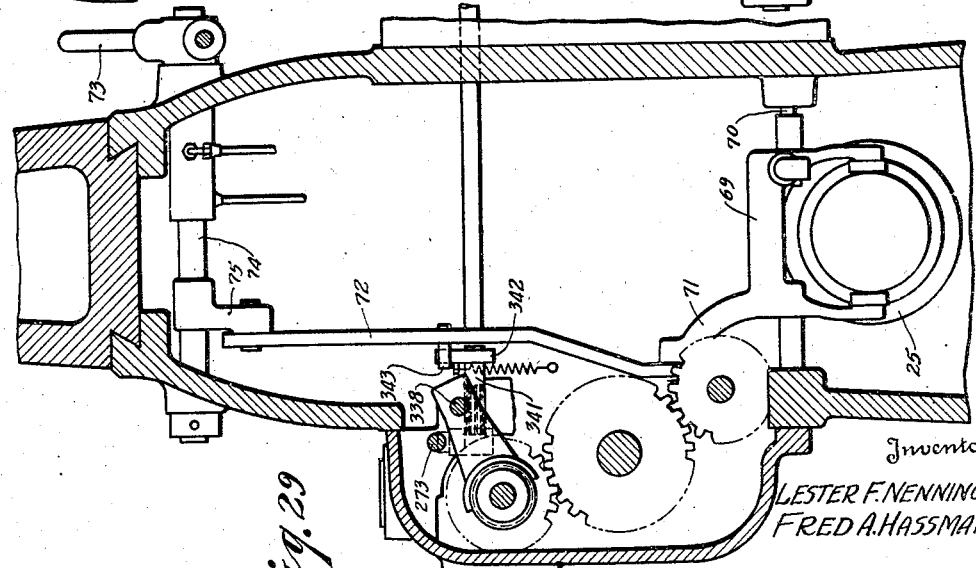

Aug. 6, 1935.   L. F. NENNINGER ET AL   2,010,556
TRANSMISSION AND CONTROL MECHANISM FOR MILLING MACHINES
Filed Feb. 29, 1932   9 Sheets-Sheet 9

Inventors
LESTER F. NENNINGER
FRED A. HASSMAN
By
Parsons
Attorney

Patented Aug. 6, 1935

2,010,556

UNITED STATES PATENT OFFICE 2,010,556

TRANSMISSION AND CONTROL MECHANISM FOR MILLING MACHINES

Lester F. Nenninger and Fred A. Hassman, Cincinnati, Ohio, assignors to The Cincinnati Milling Machine Company, Cincinnati, Ohio, a corporation of Ohio Application February 29, 1932, Serial No. 595,772

14 Claims. (Cl. 74—333)

This invention relates to milling machines and more particularly to improvements in transmission and control mechanisms therefor.

One of the objects of this invention is to improve the selectivity and range of the feeds and speeds of a milling machine in order that advantage may be taken of improved high speed cutters thereby increasing the productive capacity of the machine.

Another object of this invention is to provide a milling machine having a cutter spindle which may be rotated at higher speeds than present day machines while still retaining the advantage of low speeds for heavy cutting, and which will operate smoothly, quietly and without chatter at the high speeds as well as at the low speeds.

A further object of this invention is to provide an improved feed transmission for a milling machine having a wide selection of feed rates, the higher rates being in excess of those generally used on present day machines without sacrificing low rates so desirable for heavy milling operations, and which is so constructed that power will be transmitted to the ultimate driven member in a smooth, even flow, without substantial vibration or chatter in the moving parts.

A still further object of this invention is to provide improved variable speed transmission mechanisms for actuating the movable parts of a milling machine which combine the advantages of the sliding gear type and the constant mesh type of change speed gearing, each type being utilized at the most advantageous points whereby an highly efficient, quiet, smooth running machine is obtained; together with rate change mechanisms for each type which are combined for power actuation under unitary control to obtain a continuous geometrical progression of selective rates in the ultimate driven members.

An additional object of this invention is to provide a selective speed change mechanism for a variable speed transmission of a milling machine whereby a desired speed may first be power selected without disturbing the present setting of the transmission and subsequently power effected automatically upon deenergizing of the power selector.

Still another object of this invention is to simplify the operation of milling machines by providing means for automatically preventing the feeding of work into a non-rotating cutter; means to automatically disconnect the quick traverse transmission from a rapidly moving support before it reaches the ultimate limit of its movement, and generally improving the control mechanism that practically inexperienced attendants may operate the machine safely and expeditiously.

Other objects and advantages of the present invention should be readily apparent by reference to the following specification considered in conjunction with the accompanying drawings illustrative of one embodiment thereof, but it will be understood that any modifications may be made in the specific structural details within the scope of the appended claims without departing from or exceeding the spirit of the invention.

Referring to the drawings in which like reference numerals indicate like or similar parts:

Figure 5 is a vertical section through the column of the machine showing the branch power transmissions to the gear shift mechanism.

Figure 6 is a section on the line 6—6 of Figure 5.

Figure 7 is a section on the line 7—7 of Figure 5.

Figure 8 is a section on the line 8—8 of Figure 5.

Figure 9 is a section on the line 9—9 of Figure 6.

Figure 10 is a cross section through the selector valve.

Figures 11 to 21 inclusive are sections on the respective section lines of Figure 10.

Figure 1:
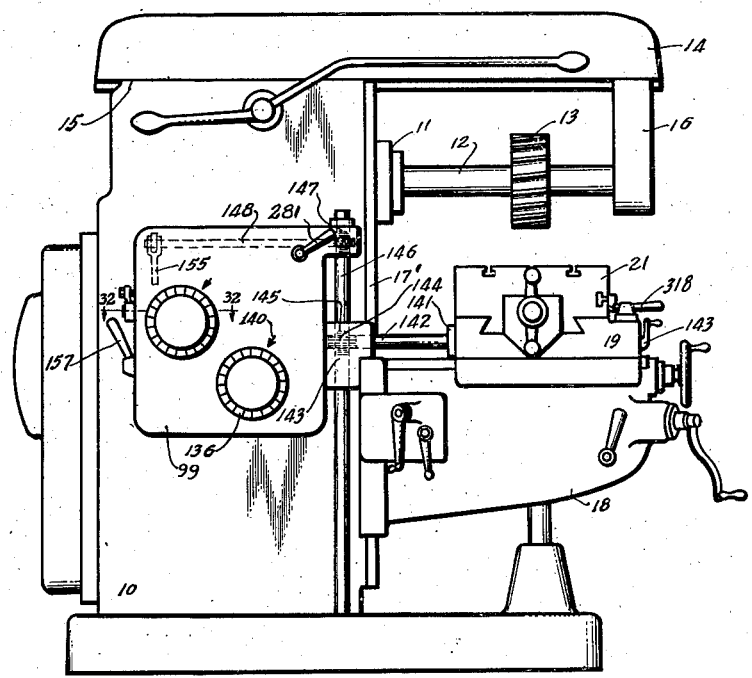
Figure 1 is a side elevation of a milling machine embodying the principles of this invention.

Figure 22 is a view of the opposite side of the machine illustrated in Figure 1 showing the rapid traverse control mechanism.

Figure 23 is a fragmentary section on the line 23—23 of Figure 22.

Figure 24 is an expanded view of the variable feed transmission.

Figure 25 is a detailed section showing the control for the feed-rapid traverse clutch.

Figure 26:
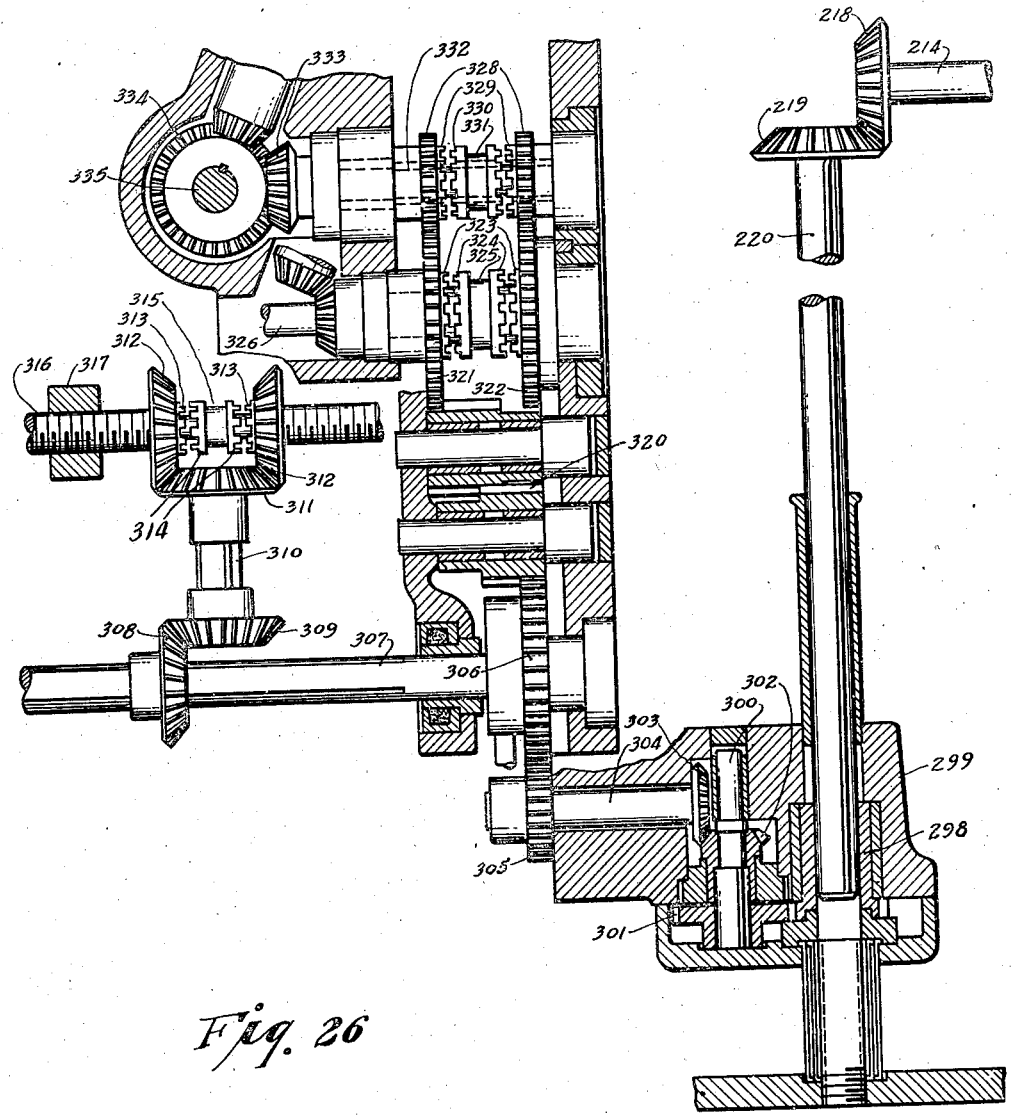

Figure 26 is an expanded view of the feed transmission in the knee.

Figures 27, 28, 32:
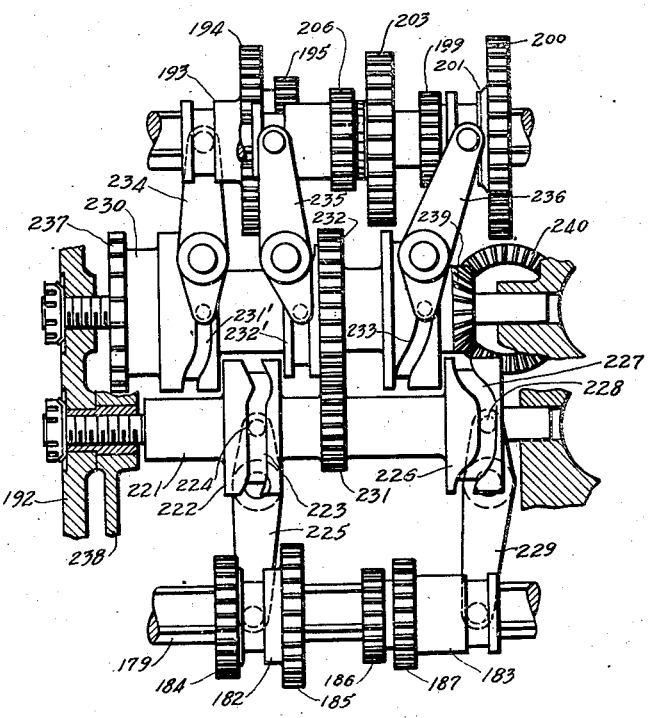

Figure 27 is an expanded view showing the power gear shift mechanism for the variable feed transmission.

Figure 28 is a detailed section on the line 28—28 of Figure 24.

Figure 29 is a section through the column showing the interlocking mechanism between the starting lever and the feed-throw-out clutch.

Figure 30 is a side elevation of the machine partially broken away as viewed from the right of Figure 29.

Figure 31:
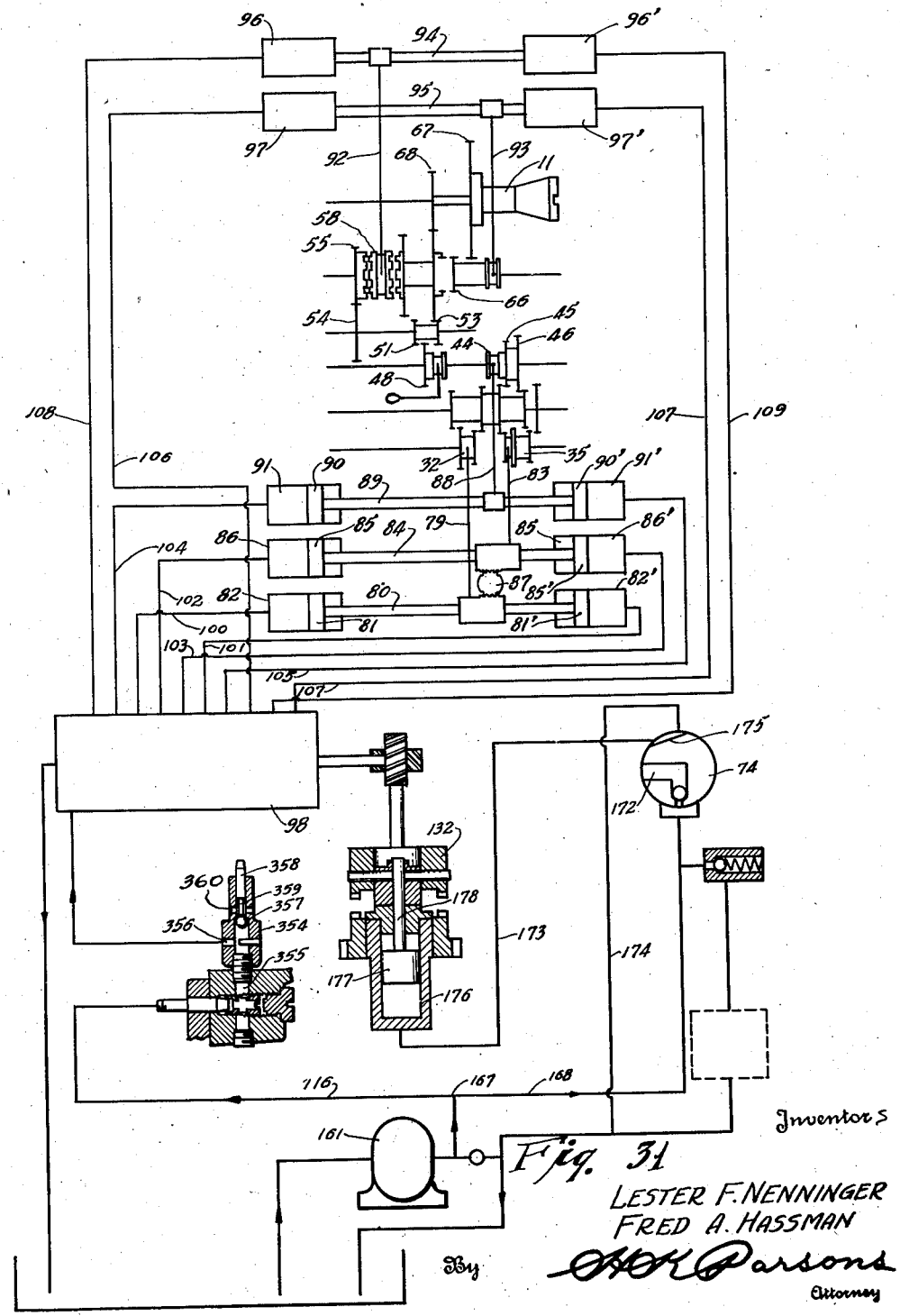

Figure 31 is a diagram of the hydraulic gear shifting system for the spindle transmission.

Figure 32 is a detail view of the spindle reverser as viewed on the line 32—32 of Figure 1.

In the drawings, the reference numeral 10 indicates the column of a knee and column type milling machine having a cutter spindle 11 journaled in the upper part thereof for rotating a cutter arbor 12 bearing a cutter 13. An overarm 14 is slidably mounted in guideways 15 formed on the top of the column and projects from the column parallel to the cutter arbor for supporting the outboard end thereof by means of an arbor support or pendant 16 which is adjustably mounted on the end of the overarm and provided with a bearing 17 for receiving the end of the arbor.

The front wall of the column is provided with a guideway 17' upon which is slidably mounted a work support organization, comprising a knee 18, which is vertically movable on the guideway 17', a saddle 19 which is slidable on horizontal guideways 20 formed on the knee for adjustment toward and from the column, and a table 21 which is reciprocably mounted on the saddle for movement transversely thereof and of the cutter arbor 12. From this it will be seen that a milling machine of the knee and column type has been provided having a cutter spindle journaled therein and a work support which is adjustable in a plurality of directions relative to the spindle and which is movable in opposition to the cutter to effect stock removal from the work.

The development of improved cutting tools for use in milling machines which are susceptible of withstanding greater heat during cutting without breaking down and therefore rotatable at higher rates of speed than cutters of the past requires machine tools having a higher range of speed and feed rates than present machines in order to develop and utilize these tools to the highest degree of efficiency.

The difficulty of providing a variable speed transmission of this nature in which the final rates are relatively high is that in the ordinary course all of the intermediate shafts and gearing of the transmission must be speeded up in order that the final member will attain the desired high rate which thereby in turn raises the lowest speed of the transmission. The spindle transmission illustrated in Figure 3, as well as the feed transmission of this machine, have been constructed in such a manner that the final high rates of each transmission are obtained without increasing the rate of rotation of the primary shafts of the transmissions.

Another difficulty experienced with high speed transmissions of the spur gear type is that they become noisy when the peripheral speed goes beyond a certain point which is very objectionable and furthermore causes considerable amount of vibration which results in chatter marks in the work. It has been found that spiral gears will run together at high peripheral speeds with little noise and vibration but such gears cannot be shifted in and out of mesh with one another to vary speed rates and therefore clutches or other means must be utilized in connection with such gears to effect rate changes. The former is known as the shiftable gear type while the latter is known as the constant mesh type of variable speed transmission. The present invention seeks to combine and utilize the advantages of both types of rate changers to improve the operation of milling machines by using the constant mesh type of rate changer in that part of both the feed and speed transmissions where relatively high peripheral speeds are developed and the shiftable gear type of rate changer in the remainder of each transmission where relatively lower or ordinary peripheral speeds exists. The manner in which this has been accomplished in connection with the spindle transmission will now be explained.

The primary shaft 22 of the spindle transmission is journaled at one end 23 in the column and at the other end in bearing 24, the shaft extending through this bearing and carrying a sliding clutch member 25 on the opposite side thereof. A friction disk clutch 26 is journaled in the opposite wall of the column which is constantly rotated during operation of the machine by a prime mover 27 located in the base of the column. A power transmitting band such as 28 connects the pulley 29 of the motor with the large pulley 30 secured to the end of shaft 31 which extends through the wall of the column for driving clutch 26. By moving the shiftable member 25 to the left as viewed in Figure 3 the prime mover will be coupled with the primary shaft 22 for actuation of the spindle and upon movement to the right will disconnect power therefrom. This clutch is shifted by mechanism which will be described later.

The shaft 22 has splined thereon a gear couplet 32 composed of gears 33 and 34 and a second gear couplet 35 composed of gears 36 and 37. The couplet 32 is shiftable right and left to engage the gears 33 and 34 with gears 38 and 39 respectively keyed to the shaft 40, while the couplet 35 is shiftable right and left to mesh the gears 36 and 37 with gears 41 and 42 respectively on shaft 40 thus making possible the transmission of any one of four speeds to the latter shaft. Mounted in the column parallel to the shaft 40 is an intermediate splined shaft 43 bearing the shiftable couplet 44, composed of gears 45 and 46, which are selectively shiftable into mesh with the gears 41 and 47 fixed to the shaft 40, this couplet making possible the transmission of any one of eight speeds to the intermediate shaft. This constitutes an eight speed rate change set of the shiftable gear type of rate changer.

A reversing gear 48 is slidably splined on the end of the shaft 43 for direct meshing with gear 49 mounted for free rotation on the back gear shaft 50 for effecting rotation thereof in one direction, and movable into mesh with the gear 51 keyed to the shaft 52 having integral therewith gear 53 meshing with gear 49 for effecting rotation of the gear 49 in the opposite direction. The direction of rotation of the cutter spindle may thus be determined by the position of the shiftable gear 48. This gear is shifted by pivoted fork 346, Figure 32, mounted in shaft 347, having a slotted block 348 integral therewith. A ball ended pin 349 eccentrically mounted on the end of shaft 350 engages the slot in block 348 so that upon rotation of the shaft by the lever 351 on the outside of the bracket, the gear will be shifted. The lever has three positions, one in which the gear is in neutral position, and the other two for determining the direction of rotation of the spindle.

The shaft 52 also has keyed thereto the gear 54, which is larger in diameter than the gears 51 and 53, and which meshes with a second gear 55 mounted for free rotation on the shaft 50 and due to the difference in the ratio of gears 54 and 51 the gear 55 will be rotated at a higher rate of speed than the gear 49. The gears 49 and 55 may be considered as terminal members of branch transmissions extending from shaft 40 to back gear shaft 50 and are provided on opposing faces with clutch teeth 56 for engagement with the clutch teeth 57 formed on opposite sides of the clutch member 58 shiftably mounted on the back gear shaft between these gears. Movement of this clutch to the right will effect rotation of the shaft 50 at any one of eight different speeds, while movement of the clutch to the left will couple the gear 55 to the shaft 50 for rotation thereof at a higher series of speeds. This constitutes a rate change set of the constant mesh type.

The shaft 50 is journaled at opposite ends in bearings 59 and 60 and is also provided with an intermediate antifriction bearing 61. A flanged member 62 is provided with a hub 63 which is journaled in the bearing 61 and has fixed to its periphery the drive gear 64. Also attached to one face of the flanged member is the internal gear or clutch member 65. The flange member and the gear and clutch carried thereby are mounted for free rotation relative to the shaft 50 or in other words the shaft 50 is bearinged for free rotation in the bore of the flange member.

Adjacent the clutch 65 is shiftable spur gear 66 splined on the shaft 50 for movement to the right into mesh with bull gear 67 integral with the cutter spindle 11; or shiftable to the left for engaging the internal teeth of the clutch member 65 to thereby couple the gear 64 to the shaft 50 for rotation thereby, the gear 64 being in constant mesh with the gear 68 also integral with the spindle. Since the gear 67 is larger than the gear 68 it is apparent that movement of the gear 66 into mesh with the gear 67 will effect a series of low speeds therein, comprising eight in number, while movement to the left will effect a series of high speeds to the spindle which are in geometric progression with the eight low speeds. These 16 speeds are all obtainable with the clutch member 58 shifted to the right into mesh with the gear 49. It will be seen that this gear set combines both types of rate changes, the shiftable gear being utilized for the lower speeds and the constant mesh gears being utilized for the higher speeds.

If now, while the gear 66 is coupled to the gear 64 or in other words is in its left hand position, the clutch 58 is shifted to the left, a still higher series of speeds will be transmitted to the spindle which will be in geometric progression with the previous 16 speeds due to the fact that the gear 55 rotates at a higher speed than the gear 49. A spindle transmission has thus been provided having a wide range between the lowest and highest speeds and in which the higher speeds are transmitted to the spindle by means of constant mesh gears providing a quiet, smooth flow of power to the transmission, while the lower speeds are transmitted by the shiftable gear type of transmission which is the most economical type to use for this purpose.

The clutch member 25 is shifted by mechanism more particularly illustrated in Figures 29 and 30. As shown in these figures, a forked member 69 is pivotally mounted on a shaft 70 journaled at opposite ends of the column, this member having a lever arm 71 pivotally connected to link 72. A starting lever 73 is keyed to the end of shaft 74 projecting through the outside wall of the column, the shaft having a crank arm 75 keyed thereto on the interior of the column which is pivotally connected to the other end of link 72. The starting lever projects parallel to the overarm and extends over the work support for convenient access thereto by the operator at his position at the front of the machine. Upward movement of this lever will effect clockwise rotation of the shifter fork thereby moving the clutch 25 into driving engagement, the parts being held in this position by a spring pressed detent 76 engaging the V shaped notch 77 formed in the end of the lug 78 cast integral with the shifter fork. Movement of the lever downward to the horizontal position shown in Figure 30 will disconnect the clutch and stop the spindle transmission.

Each of the shiftable members 32, 35, 44, 58 and 66 of the spindle transmission are power shifted by hydraulically actuated means which are illustrated in Figure 31 preferably diagrammatically in order that a clearer understanding thereof may be had. Each shiftable member is provided with a shifter fork which is secured to a piston rod having a pair of pistons on opposite ends reciprocably mounted in a pair of cylinders and actuated upon the general principle that the admission of pressure to one cylinder and the exhaust from the opposite will effect movement in one direction while reversal of these connections will effect movement in the other direction. The shiftable gear couplet 32 is therefore provided with a shifter fork 79 secured to the piston rod 80 having pistons 81 and 81' on opposite ends reciprocably mounted in cylinders 82 and 82' respectively. The couplet 35 has a shifter fork 83 secured to the piston rod 84 having pistons 85 and 85' on opposite ends thereof reciprocably mounted in cylinders 86 and 86' respectively. Since the couplets 32 and 35 are slidably mounted upon the same shaft, it is evident that if a gear of each couplet were to be meshed with their respective gears on shaft 40 that breakage of parts would result due to the attempt to transmit two different speeds to the same shaft at the same time. For this reason an interlock 87 of suitable design is provided between the piston rods 80 and 84. The one shown in application No. 395,929 filed September 28, 1929 by Nenninger and Ernst will be found suitable for this purpose and need not be described herein. The effect of this interlock is to prevent movement of either gear couplet to a power transmitting position until the other gear couplet is moved to a neutral or non-power transmitting position.

The couplet 44 is provided with a shifter fork 88 secured to the piston rod 89 having pistons 90 and 90' secured to opposite ends thereof and slidably mounted respectively in cylinders 91 and 91'. Also the shiftable members 58 and 66 are provided respectively with shifter forks 92 and 93 secured respectively to piston rods 94 and 95 having pistons secured to their opposite ends and reciprocably mounted in cylinders 96 and 96', and 97 and 97' respectively.

The position of each of these members is automatically controlled by selector valve 98 mounted in the speed control bracket 99 attached to the side of the column. An individual channel extends from each of the cylinders to the selector valve as illustrated in Figure 31. For instance, the cylinders 82 and 82' are connected by channels 100 and 101 respectively; cylinders 86 and 86' by channels 102 and 103; cylinders 91 and 91' by channels 104 and 105; cylinders 97 and 97' by channels 106 and 107 respectively; and cylinders 96 and 96' by channels 108 and 109, respectively.

The selector valve is composed of a central rotatable valve member 110 which is journaled at 111 in bracket 99 and at the other end by a fixed stud shaft 112 which projects into the end of a central longitudinal bore 113, the bore extending the length of the valve portion of the member 110 and forming an exhaust groove. Surrounding the member 110 is a sleeve 114 which is provided with a series of spaced annular grooves, there being one groove for each cylinder together with an additional groove which is a pressure groove. Surrounding the sleeve 114 and integrally secured thereto is the outside sleeve 115 which is held against rotation with respect to the member 110.

Each one of the cylinder channels 100 to 109 inclusive are threaded in the exterior sleeve and spaced therealong so that each tube is radially positioned with respect to an annular groove formed on the interior sleeve. Also threaded in the periphery of the sleeve is the pressure channel 116 which radially intersects the annular groove 117 formed on the periphery of the interior sleeve 114, the groove having a radial bore 118 therein which communicates with the longitudinal pressure groove 119 formed interiorly of the member 110 parallel to the exhaust groove 113. From this it should be apparent that a selector valve comprising an inner-rotative member having a pressure groove and an exhaust groove, and a fixed exterior member of double sleeve construction has been provided, into which are threaded the channels extending to the various cylinders of the power gear shift mechanism.

To effect shifting of the gears in such order as to effect all of the possible changes of speed in geometrically progressive order, the member 110 and the inner sleeve 114 are drilled radially and in proper circumferential order that each twentieth of a revolution of the interior member will effect a new position of the shiftable members and thereby a new resultant speed in the spindle.

This is best understood by reference to Figures 11 to 21 which shows the various connections to effect the lowest rate of speed of the transmission. Referring to Figure 11 it will be seen that the fluid pressure enters the valve through channel 116, passes around annular groove 117 and through the radial bore 118 into the pressure groove 119. Referring to Figure 12 it will be seen that the pressure from the channel 119 will flow through the port 108' and annular groove to pipe 108 leading to cylinder 96, shifting the clutch member 58 to the right as viewed in Figure 23, while the opposite cylinder 96' will be connected to reservoir through channel 109, as shown in Figure 20, port 109' which communicates with the return line 113.

Similarly as shown in Figures 14, 15, 18 and 19, channels 100, 102, 105 and 106 will be simultaneously connected to pressure, shifting their respective gears, while the opposed cylinders by means of channels 103, 104 and 107, Figures 16, 13 and 21 are connected to return channel 113. It will be noted from Figures 14 and 17 that the channels 100 and 101 are both under pressure and this serves to neutralize the gear couplet 32 in a non-power transmitting position while the other couplet 35 is in a power transmitting position. If the selector valve member 110 is now rotated through one-twentieth of a revolution, since there are twenty speed changes illustrated in this transmission, or in other words in a clockwise direction as viewed in Figures 11 to 21, the next higher geometrically progressive speed will be effected. From this it should be apparent that with each twentieth of a rotation of the member 110 the next highest speed will be effected and so on in progressive order up to the highest speed since the selector valve is unidirectionally rotated. After the highest speed has been effected the next rotation or indexing of the selector valve will bring about the lowest speed of the transmission.

Figures 3, 4:
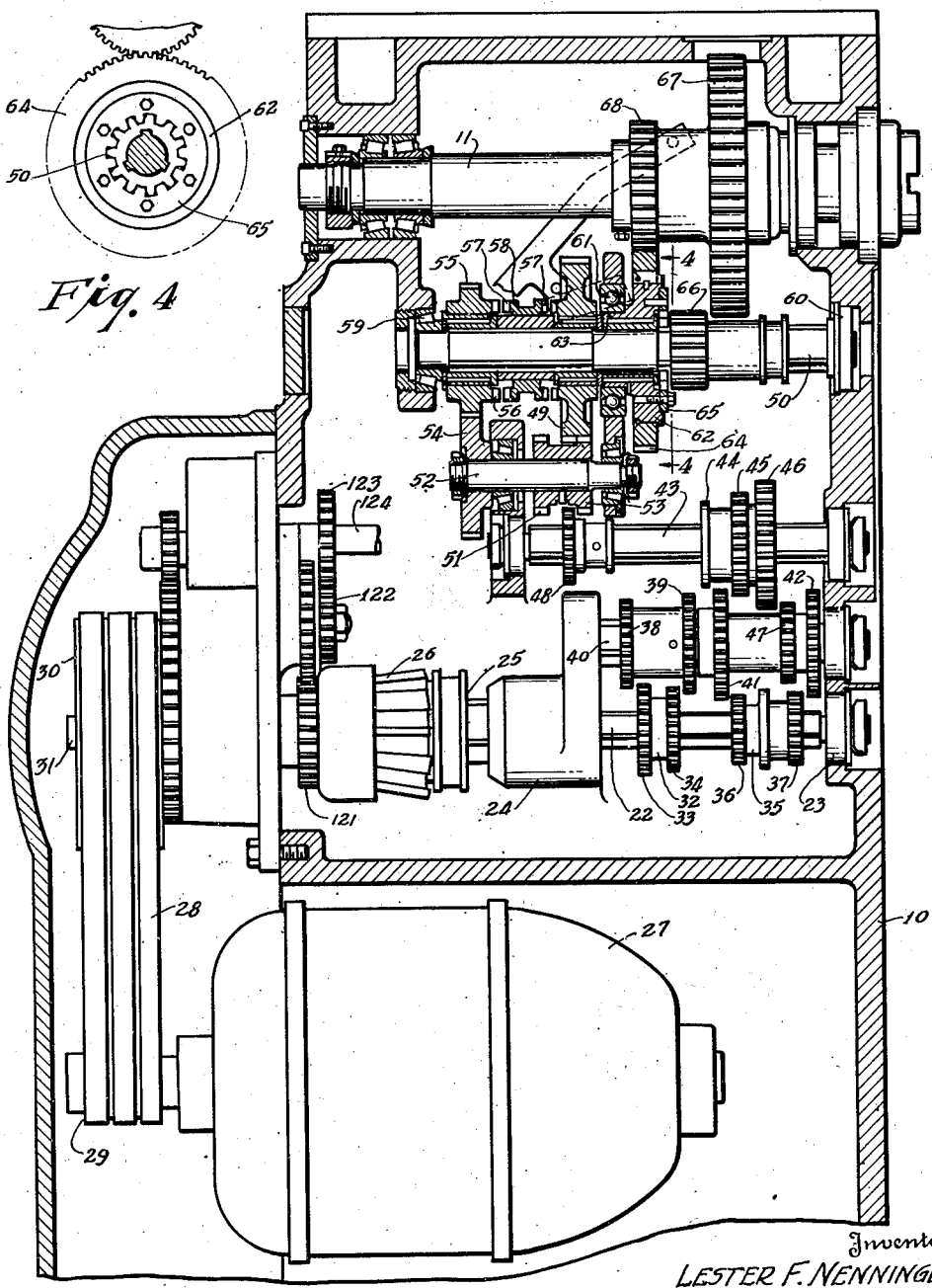
Figure 3 is an expanded view of the spindle transmission.
Figure 4 is a detailed section on the line 4—4 of Figure 3.

To insure that the selector valve is accurately positioned and held in each one of its positions or stations, a detent wheel 120 is integrally secured to the member 110 for cooperation with a spring pressed detent not shown. The selector valve is power rotated to any position and the power rotation is adapted to be controlled from a plurality of operating positions at the machine. The transmission for effecting this is shown in Figures 3, 5 and 24.

A gear 121 is secured to the shaft 31 and through an intervening gear train illustrated generally by the reference numeral 122 rotates the gear 123 secured to the shaft 124. As shown in Figure 24 this shaft carries a worm 125 meshing with a spiral worm gear 126 keyed to the shaft 127 extending transversely of the column. This shaft as shown in Figure 5, has a pinion gear 128 on the opposite end meshing with a second gear 129 mounted for free rotation on the cylindrical member 130. Formed integrally with the gear 129 is a clutch member 131 engageable by the shiftable clutch member 132 splined to the shaft 133. This shaft carries a spiral gear 134 meshing with the spiral gear 135 integrally secured to the member 110, Figure 10.

Since the gear 121 is continuously rotated during operation of the prime mover, it is apparent that the gear 129 and clutch 131 are also continuously rotated thereby making possible a change of spindle speed while the transmission is stopped which is the desirable manner of accomplishing the same. Movement of the clutch 132 into engagement with the clutch 131 will effect power rotation of the selector valve and its position is determined by a dial 136 which is simultaneously rotated with the selector valve by means of a gear 137 keyed to the end of the shaft 133 meshing with the gear 138 secured to the end of the stud shaft 139 which carries the dial on its exterior end. A fixed pointer 140 is secured to the outside of the speed bracket 99 as a reference mark from which in cooperation with the dial the operator can determine the position of the selector valve and thereby the speed of the transmission.

The clutch 132 may be shifted from the operator's position in the front of the machine by means of the following mechanism. A shaft 141 is journaled in the saddle for longitudinal movement therewith, this shaft telescopingly receiving a second shaft 142 fixed in a bracket 143 attached to the knee for vertical movement therewith and capable of being rotated by the member 141. A control lever 143 is fixed to the forward end of the shaft 141 for effecting movement thereof to either one of two positions.

The shaft 142 has a series of rack teeth 144 on its periphery engaging rack teeth 145 formed on the reciprocable member 146 which has similar rack teeth 147 formed on the upper end engaging pinion teeth on the member 148. The shaft 148 is journaled in the upper part of the bracket 99 and extends to the rear of the machine where it is provided with a crank arm 149. A bell crank 150 is pivotally mounted at 151 in the bracket and has a forked arm 152 engaging the clutch member 132 and a second arm 153 having a roller 154 in tne outer end thereof engaging the end of link 155 which is pivoted at its upper end to the crank arm 149.

Figure 2:
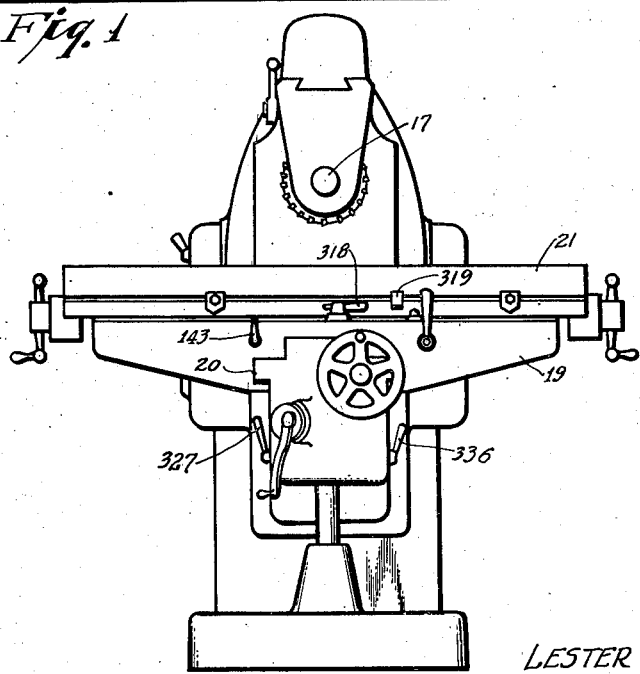
Figure 2 is a front view of the machine shown in Figure 1.

Movement of the lever 143 to the left as viewed in Figure 2 will cause counter-clockwise rotation of the shaft 142 and thereby through the rack and pinion connection upward movement of the member 146 which in turn will effect counter-clockwise movement of the crank arm 149 and upward movement of the link 155. This will cause the link to move away from the arm 153 of the bell crank and a spring 156 will cause retraction of the clutch. Movement of the lever 143 in a clockwise direction will, through the mechanism described, cause downward movement of the link 155 and thereby through the bell crank effect engagement of the clutch to power rotate the selector valve. From this it will be seen that although the operator is at the front of the machine he is able to effect a change in the rate of spindle rotation without leaving his position. An additional control has been provided in case the operator is at the rear of the machine which comprises a lever 157 secured to the end of the shaft 158 which extends inside the bracket and has a cam member 159 secured thereto. This cam member engages a second roller 160 on the lever arm 153 to effect downward movement of the arm and thereby engagement of the clutch.

Hydraulic pressure is supplied to the selector valve from a pump 161 which is mounted inside the column as shown in Figures 5 and 24 and rotated by the previously mentioned shaft 124 by couplet 162. Since the shaft 124 is continuously driven from the prime mover the pump will likewise be continuously actuated during operation of the machine. A reservoir 163 is formed in the column over the motor chamber and fluid is drawn from this reservoir through a strainer 164 and channel 165. The forward pressure line 166 from the pump extends to an elbow 167 from which the selector valve supply line 116 branches. The other branch 168 extends to the control valve formed on the shaft 74 of the spindle clutch starting lever.

It is desirable when changing the speed of the spindle to stop the spindle transmission because the different speeds of rotation of the relative gears to be meshed causes considerable noise and clashing as well as the possibility of breakage thereof. To insure against this, means have been provided for positively preventing the making of any gear shift while the transmission is running. It comprises an inter-lock between the spindle clutch starting lever, selector valve and power clutch 132. Any suitable means may be provided for this purpose but in the present instance hydraulic means have been utilized, and therefore the shaft 74 has been formed as a control valve for this purpose.

A bushing 169 has been fitted in the side of the column for receiving the shaft 74. The pressure line 168 is threaded in the bushing as shown in Figure 6 and communicates with an annular groove 170 formed in the periphery of the member 74. A longitudinal groove 171 extends lengthwise to the shaft 74 and at its other end communicates with the L-shaped passage 172 as shown in Figure 8. A pair of channels 173 and 174 are threaded in the bushing 169 in the plane of the passage 172. The member 74 is also provided with a cut-away portion 175 whereby when the shaft 74 is in the position shown, the channel 174 is coupled to the channel 173. By clockwise rotation from the position shown in Figure 8, the pressure channel 172 will be coupled to the channel 173 thereby disconnecting it from the return line 174. The channel 173 extends to a small cylinder 176 formed in the end of the member 130 having reciprocably mounted therein a piston 177, which is connected by piston rod 178 to the clutch member 132. From this mechanism it will be seen that when the starting lever 73 is in a horizontal position the valve portion of the shaft 74 will be in the position shown in Figure 8 and channel 173 leading from the interlock cylinder 176 will be connected to the reservoir line 174 thereby permitting engagement of the clutch 132 to effect a power rotation of the selector valve while upon rotation of the shaft 73 in a counter-clockwise direction, the valve portion of the shaft 74 shown in Figure 8 will move in a clockwise direction thereby coupling the pressure channel 172 to the channel 173 leading to the inter-lock cylinder, filling the same with pressure and preventing engagement of the clutch 132 or if engaged effecting disengagement thereof.

The determination of the rate of a variable speed transmission may be accomplished automatically by different methods. A change speed mechanism may be provided having a cycle of movement which will progressively effect each speed as it moves through its cycle. In other words, the shiftable members of the transmission are successively positioned corresponding to each rate and when the rate desired is arrived at, the mechanism is stopped. This is known as progressive shifting. Another method is to provide some means by which a selection of rate can first be made, and then means provided for effecting that rate by shifting only those members necessary to be repositioned in accordance with the new rate. This latter method is known as the selective method of changing speeds. Improved means have been provided in the present invention for accomplishing this selective method and comprises a relief valve 354 which is inserted in the selector valve supply line 116. The valve has an axial bore 355 connected to the pump and a radial port 356 connected to the selector valve. A ball 357 is mounted in the upper end of the bore which normally closes the same, due to the pressure acting on the ball. A plunger 358 is reciprocably mounted in the valve above the ball having a reduced diameter 359. Radial exhaust ports 360 are formed in the valve body opposite the reduced port of the plunger. A lug 361 is provided on the clutch lever 153 so that downward movement of the lever to effect power rotation of the selector valve will depress the plunger and relieve or close off the pressure in supply line 116 to such an extent that no shifting will take place. The selector valve is rotated to the desired position or in other words the desired rate is selected at which time the lever 153 is moved upward, disconnecting the clutch and permitting the plunger and ball to lift which terminates flow to the exhaust ports and causes the pressure to rise to effect the desired shift made.

Thus a variable speed transmission for the spindle of a milling machine has been provided having a wide range of selective speeds together with an hydraulically operated speed change mechanism under the control of a selector valve which is power rotatable by the prime mover of the machine to select a predetermined speed which is subsequently effected automatically upon uncoupling of the selector valve from the prime mover, said coupling being remotely controlled from two different operating positions at the machine; and an interlock mechanism between the spindle clutch starting lever and the power rotation or indexing of the selector valve to prevent speed changes being made during actuation of the spindle.

A variable feed transmission has also been provided for effecting power movement of the various members of the work support organization comprising the saddle, table and knee. This transmission is shown more particularly in Figure 24 and comprises a primary shaft 179 which is actuated from shaft 124 through a pair of gears 180 and 181. Slidably mounted on shaft 179 are the gear couplets 182 and 183, the former comprising gears 184 and 185, while the latter is composed of gears 186 and 187. The gears 184 and 185 are shiftable into mesh with gears 186' and 187' keyed to the shaft 188 while the gears 186 and 187 are shiftable into mesh with gears 189 and 190 also keyed to shaft 188 whereby four different speeds may be imparted thereto.

The second intermediate shaft 191 is journaled in the feed bracket 192 and carries the shiftable gear couplet 193 composed of gears 194 and 195 shiftable respectively into mesh with gears 196 and 187' carried by the shaft 188. A large gear 197 and a pinion gear 198 are keyed to the shaft 191 and engageable respectively with the gear 199 and gear 200 of the couplet 201 slidably mounted on the splined shaft 202. A gear 203 is mounted for free rotation on the shaft 202 in constant mesh with gear 204. A second gear 205 is formed integral with the gear 204 and is adapted to be engaged by the shiftable clutch gear 206 slidably splined on the shaft 202. This gear has clutch teeth 207 on one face engaging clutch teeth 208 formed on one side of the gear 203.

It will be noted that the gear 206 is smaller than the gear 203 and for that reason the latter gear will effect a higher rate of rotation than the former. The shiftable couplet 201 makes possible the transmission of 16 speeds to the shaft 202 and if the gear 206 is in mesh with the gear 205, sixteen speeds will be transmitted to that gear. If now the clutch 207 is meshed with the clutch teeth 208 of gear 203 the drive will then be through gear 203 to the gear 204 and by shifting the couplets 182 and 183 on the primary shaft 179 a series of four higher speed rates may be obtained which are in continuous geometrical progression with the sixteen speeds.

The gears 204 and 205 comprise a single member which is mounted on the periphery of a ratchet member 209, Figure 28, having a pivoted pawl 210 adapted to engage ratchet teeth 211 formed on the periphery of the clutch member 212 which is mounted for free rotation on the sleeve 213. The shaft 214 has a portion journaled in the sleeve and a splined portion extending beyond the sleeve upon which is mounted the shiftable clutch member 215 which has clutch teeth 216 on one face engageable with the clutch teeth 217 formed on the end face of the member 212. When this feed clutch is engaged, the feed transmission gear 205, which is unidirectionally rotated, will through the pawl 210 effect rotation of the shaft 214. A bevel gear 218 keyed to the end of the shaft 214 meshes with bevel gear 219 keyed to the upper end of shaft 220 forming a common drive shaft to the saddle, table and knee.

The gear couplet 204, 205 is impositively connected to the member 209 by means of the spring pressed balls 352 mounted in the ratchet member engaging sockets 353 formed on the interior of the couplet. This arrangement constitutes a safety gear and permits slippage to take place in case of overload.

The various shiftable gears of the variable feed transmission are power shifted to the various positions by means of the mechanism shown in Figure 27. A cam shaft 221 is journaled in the feed change bracket 192 adjacent the shaft 179 and provided with a cam 222 having a cam path 223 which guides the roller 224 rotatably mounted on one end of the shifter fork 225 which is connected at the other end to the gear couplet 182. A second cam 226 is integral with this shaft and provided with a cam groove 227 for guiding the cam roller 228 rotatably mounted on the end of the pivoted shifter fork 229 connected to the couplet 183. The contour of each of these cam paths is such that an increasing progressive change of feed rate will be effected in the shaft 188. The cam shaft 221 is actuated from a second cam shaft 230, journaled parallel therewith, by means of inter-meshing gears 231 and 232. The cam shaft 230 has three cam paths 231', 232' and 233 formed in the periphery thereof for actuating the shifter forks 234 of couplet 193, shifter fork 235 of clutch gear 206 and shifter fork 236 of couplet 201. To insure that the cams and gears are held in their various positions, a star wheel 237 is secured to the end of the shaft 230 and a spring pressed detent 238 cooperates therewith to maintain the parts at any of the possible stations thereof.

The cam shafts are adapted to be power rotated by a branch transmission from the prime mover which comprises the following mechanism. A bevel gear 239 is fixed to the end of the cam shaft 230 in mesh with bevel gear 240 keyed to the end of the shaft 241 shown more particularly in Figure 5. This shaft extends transversely of the column and has mounted for free rotation thereon the worm gear 242 driven by the worm 243. The worm 243 is fastened to one end of shaft 244 which has a gear 245 fixed to the other end meshing with gear 246 fixed to the primary shaft 179 of the feed transmission. Since the primary shaft 179 is directly connected to the prime mover, the worm gear 242 will be constantly rotated during operation of the machine.

A clutch member 247 is mounted on a sleeve 248 which is fixed to the shaft 241 for longitudinal and rotative movement therewith, the member 247 having clutch teeth 249 movable into engagement with clutch teeth 250 formed on one face of the worm gear 242 upon longitudinal movement of the shaft 241. The clutch 247 is connected to the sleeve 248 by the friction coupling 251 comprising a plurality of disk members, the alternate members of which are fixed to the flange 247 and the intervening members keyed to the sleeve 248. A spider 252 holds the friction members in tight engagement with one another. The object of this construction is to provide a slip connection between the positive driving means of the branch transmission and the gear shift mechanism so as to prevent breakage of the parts, in case a gear to be shifted should contact the side of its mating gear without immediately moving into mesh therewith.

The shaft 241 is shiftable to effect engagement of the clutch teeth 249 and 250 by means of a spool 253 pinned to the shaft and engaged by a shifter fork 254 keyed to the end of a horizontal shaft 255 which has a lever arm 256 fixed to the other end as shown in Figure 5. This lever arm has a pin 257 mounted in the outer end thereof engaging a slot 258 in the link 155 whereby upward movement of the link would effect axial shifting of the shaft 241 to effect clutch engagement while downward movement of the link 155 would permit the spring 156 to come into action to effect disengagement of the clutch. By coupling the arm 256 with the link 155, it is possible to control both the power shift for the speed transmission and the power shift for the feed transmission from the same control levers at front and rear of the machine.

The shaft 241 has a gear 259 secured thereto meshing with the gear 260 integrally connected to the end of the stud shaft 261 which projects through the gear shift bracket 99 to receive the feed dial 262 secured to the outer end thereof for indicating to the operator the rate at which the feed transmission is set.

In addition to the feed transmission for the various members of the work support organization, means have also been provided for moving these members at a quick traverse rate comprising a rapid traverse transmission shown more particularly in Figure 24 which may be selectively coupled to the common drive shaft 220. As shown in that figure, the shaft 124 is provided with a gear 263 meshing with gear 264 mounted for free rotation on the sleeve 265. Integrally connected to this gear is a second gear 266 which meshes with gear 267 having integrally connected therewith a gear 268 which meshes with gear 269 mounted for free rotation on shaft 214. This gear constitutes a driving member for the friction disk clutch 270 which is adapted to be coupled to the shaft 214 by the sliding clutch member 271 splined on the shaft and adjacent the feed clutch member 215.

It will be noted from this construction that two shiftable clutch members have been provided, one for coupling the feed transmission to the shaft 214 and the other to couple the rapid traverse transmission to said shaft, the final feed gear on the shaft being provided with a ratchet mechanism whereby the same may be overrun during actuation of the shaft at a rapid traverse rate which is possible because all parts rotate in the same direction. A single clutch could have been provided having teeth on one end to engage the final feed gear and means on the other end for engaging the rapid traverse, but it has been found that under certain operating conditions when the load on the work support was extremely heavy that considerable difficulty was experienced in disconnecting the feed side of the clutch due to the tremendous amount of friction between the faces of the clutch teeth which in some cases might cause breakage of the rapid traverse control lever or at least severe strain in the connecting mechanism. For that reason the clutch has been divided into two parts, the rapid traverse clutch being of the friction disk type which is easier to engage and disengage and especially when the transmission is already being actuated at a feed rate.

The mechanism for shifting the rapid traverse clutch member 271 is more particularly shown in Figure 25 and comprises a shifter fork 272 which is secured to the shifter rod 273 slidably mounted in bores 274 formed in the upper part of the feed bracket 275. In milling machines of the type under discussion, it is usually desirable to have the rapid traverse clutch normally disengaged and to provide means for automatically disengaging it so that when the operator wants to quickly move any part of the work support he has merely to operate the lever; and after obtaining the desired movement releasing the same whereby the rapid traverse transmission is automatically disconnected. This result is accomplished in the present mechanism by providing a spring 276 in one of the bores in which the shifter rod slides which is so chosen that the rapid traverse clutch is held normally in a disconnected position.

The shifter rod 273 has a slot 277 cut in one side thereof for receiving the ballshaped end 278 of a crank arm 279 which is fixed to rotatable shaft 280. This shaft extends transversely of the column to the opposite side of the machine where it projects through the speed change bracket 99 to receive the manually operated lever 281 see Figure 30. This makes it possible to control the rapid traverse clutch from the normal operating position at the rear of the machine.

A second control is extended to the front of the machine as shown in Figure 22 so that the operator may quickly obtain a rapid traverse movement from that position. To this end the shifter rod 273 is provided with rack teeth 282 meshing with pinion teeth 283 formed on the periphery of a vertical shaft 284 rotatably mounted in the feed bracket 192. The vertical shaft 284 is splined in a pinion 285, Figure 23, which is fixed with the knee for vertical movement up or down therewith. This pinion meshes with rack teeth 286 formed on a reciprocable connecting member 287 which has rack teeth 288 formed on another face thereof at right angles to the first rack teeth, meshing with the pinion teeth 289 formed on the end of a rotatable shaft 290. The shaft 290 is fixed against longitudinal movement with the knee and telescopingly engages shaft 291 fixed against axial movement in the saddle of the machine whereby the saddle may be adjusted transversely of the knee without breaking the operating connection. A rapid traverse control lever 292 is fixed to the end of the shaft 291 and from the mechanism described it should now be apparent that movement of this lever will cause shifting of the rod 273 against the compression of spring 276 to effect engagement of the rapid traverse clutch, while the mere release of this lever will permit the spring 276 to come into action and return the parts to normal position.

In the operation of milling machines it has been found that inexperienced operators unfamiliar with the rapid traverse rate of the different supports will engage the rapid traverse clutch to cause quick traverse of a particular support but the movement will be so fast that the support will reach the end of its travel before the operator realizes it thereby causing serious damage to the machine. To insure against this, a limit stop has been provided which will automatically disconnect the rapid traverse clutch before the support has reached the limit of its travel. This means comprises a plunger 293 which is reciprocably mounted in the saddle adjacent the side of the table, the lower end of the plunger being provided with rack teeth 294 engaging pinion teeth 295 formed on the periphery of the shaft 291. The plunger 293 being adjacent the side of the table makes it possible to mount trip dogs 296 in T slots 297 formed on the longitudinal face of the table for depressing the plunger and automatically disconnecting the rapid traverse clutch.

The automatic disconnection of the rapid traverse clutch still makes it possible for the feed transmission to be engaged and unless the same is either manually or automatically disconnected, the particular support will continue to move at a feed rate. The particular support will thus move to the end of its travel and ordinarily cause damage due to the power of the feed transmission. Additional safety means have therefore been provided in the form of the safety gear previously explained. The slipping point of this gear is usually such that slippage will take place before any damage will be done to the transmission parts, especially the lead screws of the various supports.

As shown in Figure 26 the common drive shaft 220 of the various supports is telescopingly splined into a gear 298 fixed against axial movement in a rearwardly extending bracket 299 fixed to the knee. Also mounted in this bracket is a short vertical shaft 300 having a gear 301 on the lower end meshing with the gear 298 and a bevel gear 302 splined thereto meshing with bevel gear 303 fixed to the end of a short horizontal shaft 304 which is journaled in the rear wall of the knee. A gear 305 is keyed to this shaft in engagement with a gear 306 fixed to the end of a horizontal spline shaft 307 which extends through the knee for rotating a bevel gear 308 movable axially of the shaft with the saddle of the machine.

This bevel gear actuates the table feed screw by means of a gear 309 meshing therewith secured to the end of shaft 310 which is journaled in the saddle and carries a bevel gear 311 at the upper end thereof, meshing with the reversing gears 312. These gears carry clutch teeth 313 on their inner face engageable with clutch teeth 314 formed on opposite faces of the shiftable clutch member 315. The bevel gears 312 are mounted for free rotation with respect to the table lead screw 316 while the shiftable clutch member 315 is splined on the lead screw for effecting rotation thereof, the screw passing through a nut 317 fixed to the saddle while the opposite ends of the screw are journaled in the ends of the table. A suitable control lever such as 318 shown in Figures 1 and 2 may be utilized for shifting this clutch member manually, the ends of the lever being adapted to be trip actuated by dogs 319 carried in the T slots in the front of the table for automatic control thereof.

The transmission to the saddle and knee is actuated from the gear 306 which, through intermediate gearing indicated generally by the reference numeral 320, rotates a pair of gears 321 and 322 in opposite directions. Clutch teeth 323 are formed on the adjacent faces of these gears for selective engagement with clutch teeth 324 formed on opposite faces of the shiftable clutch member 325 which is splined to the saddle lead screw 326. A suitable control lever 327 is mounted on the side of the knee as shown in Figure 2 for shifting the clutch 325 in either position as is usual practice in such machines.

The gears 321 and 322 mesh with a second pair of gears 328 which also rotate in opposite directions and are provided with clutch teeth 329 on opposite faces which mesh with clutch teeth 330 formed on opposite ends of the shiftable clutch member 331 splined to the shaft 332 which has a bevel gear 333 on the interior end thereof meshing with the bevel gear 334 which rotates the elevating screw 335 of the knee. A control lever 336 is mounted on the side of the knee for shifting the clutch 331 into either position for effecting power movement of the knee in the usual manner of such mechanism.

From the foregoing it will be seen that the common drive shaft 220 drives three branch transmissions to the saddle, table and knee respectively and that each branch transmission is provided with its own individual reverser whereby any one of the 20 feed rates of which the feed transmission is capable, or the rapid traverse rate, may be selectively coupled therewith for actuation thereby.

It is desirable in milling machines of the present type to insure that the feed transmission is disconnected when the spindle is stopped to prevent movement of a work piece against a nonrotating cutter as such collision causes serious damage to the cutter as well as possible breakage thereof. An interlock has therefore been provided between the spindle starting clutch control lever 73 and the feed clutch 215. This mechanism is more particularly illustrated in Figures 25, 29 and 30.

As shown in Figure 25, a shifter fork 337 is secured to a shifter rod 338 slidably mounted in the upper part of the feed bracket 192 parallel to the rapid traverse shifter rod 273 for shifting the clutch 215. Rack teeth 339 formed on one end of the shifter rod 338 engage pinion teeth 340 formed on the end of the rotatable member 341 which is also journaled in the bracket 192. A crank arm 342 is secured to the opposite end of the member 341 and is so positioned thereon as to lie in the path of a knock-out pin 343 fixed in a projecting lug 344 of the connecting link 72 a spindle starting clutch control mechanism. A spring 345, fixed at one end, engages the crank arm 342 in such a manner as to hold the clutch 215 into engagement with the clutch teeth 217 of the final feed gear on the shaft 214. Upon upward movement of the lever 73 to effect engagement of the spindle clutch, the pin 343 will move away from the crank arm 342 permitting the spring 345 to cause engagement of the feed clutch; and downward movement of the lever 73 to a stop position will cause rotation of the crank arm 343 against the pressure of spring 345 to cause disengagement of the clutch.

In accordance with the foregoing, an improved transmission and control mechanism for a milling machine has been provided making possible a wide range of rates for the cutter member and the work support, said rates extending to a higher limit than generally used heretofore making possible the utilization of improved cutting tools which in turn increases the productive capacity of the machine. Various improvements in the control mechanism have also been provided including the improved hydraulically actuated selective gear shift mechanism for the spindle which is interlocked with the starting lever to prevent changes being made while the transmission is running, and which is provided with dual remote control for operation from the front and rear of the machine. Additional safety features have been incorporated in the machine which facilitates its operation and control permitting the operator to direct more attention to the accomplishment of the work in hand than to the intricacies of the machine which improves the quality of the work as well as production.

What is claimed is:

1. A milling machine having a cutter spindle, a prime mover, means to actuate the spindle at a plurality of speeds by the prime mover comprising an intermediate shaft, a change speed gear set coupling the prime mover to the shaft, different ratio branch transmissions actuated by the shaft, a back gear shaft, a shiftable clutch member coupling the lower ratio branch transmission to the back gear shaft, a pair of gears fixed to the spindle, means to alternately couple the back gear shaft with said spindle gears to effect a geometrically progressive series of speeds therein, and means to shift said clutch member to couple the higher ratio branch transmission to the back gear shaft to effect an additional progressive series of speeds in the spindle, said additional series being an extension of the first geometrical series of speed.

2. In a variable speed transmission for actuation of a driving part at a plurality of rates of speed by a prime mover, the combination of an intermediate shaft, a change speed set including a plurality of shiftable gears coupling the shaft to a prime mover, a back gear shaft, a shiftable member for connecting the intermediate shaft to the back gear shaft in different speed ratios, a second shiftable member for coupling the back gear shaft to the driven part in different speed ratios, the position of each of said shiftable members making possible a series of progressive speeds in said part, all of said series comprising a complete geometrical progression, individual hydraulically actuated means for shifting said shiftable gears and members and a common control for all of said hydraulically actuated means.

3. A transmission and control mechanism comprising a primary shaft, a change speed set including a plurality of shiftable gears actuated thereby, said set terminating in an intermediate shaft, a back gear shaft, different ratio branch transmissions extending from the intermediate shaft to the back gear shaft, a shiftable clutch member for selectively coupling either transmission to said shaft for actuation thereby at different series of rates, a final driven member, a shiftable member for coupling the back gear shaft to the final driven member in different speed ratios, individual hydraulically actuated means for shifting said gears and said shiftable members, a selector valve for controlling the admission of pressure to said means to effect shifting of the parts in predetermined order whereby rotation of the selector valve will effect a geometrical series of speed rates in the transmission.

4. A variable speed transmission comprising a primary shaft, a change speed shiftable gear set actuable thereby, and terminating in an intermediate shaft, a back gear shaft, different ratio branch transmissions extending from the intermediate shaft to the back gear shaft, a shiftable clutch for coupling either transmission to said shaft, different speed ratio gears interposed between the back gear shaft and a final driven member, a shiftable member for selectively coupling said gears to the back gear shaft, hydraulic means for shifting the shiftable gears and the shiftable members, a selector valve for determining the members to be pressure shifted, a branch transmission actuable by the primary shaft and means to couple the branch transmission to the selector valve for power rotation thereof to effect a geometrically progressive series of speed rates in the cutter spindle.

5. In a milling machine having a column, a work support mounted on the column and a cutter spindle journaled therein, the combination of means to actuate the spindle at a plurality of selective rates including a prime mover, a variable speed shiftable gear transmission actuated by the prime mover, said transmission terminating in an intermediate shaft, a back gear shaft, a plurality of different speed ratio gear trains between the intermediate shaft and back gear shaft, a shiftable clutch member for coupling either train to the back gear shaft, additional speed ratio trains coupling the back gear shaft to the spindle, a shiftable clutch member therefor, hydraulically actuated means for shifting the gears and clutches in sequential order to effect a geometrically progressive series of speeds in the spindle, a selector valve mounted in the column, a branch transmission actuated by the prime mover, means for coupling the branch transmission to the selector valve for rotation thereby, means for controlling power rotation of the selector valve and additional control means mounted in spaced relation to the first named control means whereby the speed rate of the spindle may be changed from a plurality of operating positions.

6. A milling machine having a spindle, a prime mover, a transmission extending from the prime mover to the spindle including an intermediate shaft, a variable speed shiftable gear set coupling the prime mover to the shaft for actuation thereby at a series of speeds, a back gear shaft, different ratio branch transmissions between the shafts, different ratio gearing between the back gear shaft and the spindle, individual shiftable clutches on the back gear shaft for coupling either branch transmission thereto and for coupling either ratio gearing to the spindle, means to position the clutches for actuation of the spindle at one series of progressive speeds, means to shift one of said clutches to effect actuation of the spindle at a second series of progressive speeds, and means to shift the other clutch for actuation of the spindle at a third series of progressive speeds, the combination of said series forming a continuous geometrical progression.

7. A variable speed transmission including a primary driving member, an intermediate shaft, change speed gearing coupling the primary member to said shaft for actuation thereof at a plurality of speeds, a back gear shaft, different ratio branch transmissions extending from the intermediate shaft to the back gear shaft, a shiftable clutch coupling one of said transmissions to the back gear shaft, a final driven member having a gear couplet fixed thereto, means to couple alternately the back gear shaft with said couplet to effect geometrically progressive series of speeds in the final driven member, and means to shift said clutch to couple the other branch transmission to the back gear shaft to effect a higher series of progressive speeds in the final driven member, said last series being a continuation of said first progressive series.

8. A transmission for the spindle of a milling machine including a prime mover, an intermediate shaft, a shiftable gear change speed set coupling the prime mover to the shaft, hydraulically actuated means for shifting the gears of said sets, a back gear shaft, a constant mesh change speed set coupling the intermediate shaft to the back gear shaft including a shiftable clutch member for varying the rate thereof, hydraulically actuated means for shifting said clutch member, a shiftable gear-constant mesh rate change set coupling the back gear to the spindle including a shiftable gear, hydraulically actuated means for shifting said gear, a selector valve, means coupling all of said hydraulically actuated means with the selector valve, and means for positioning said valve to determine selectively the members to be actuated and thereby the speed of the spindle.

9. A transmission and control mechanism for the spindle of a milling machine including a prime mover, an intermediate shaft, a change speed set coupling the prime mover to the shaft, a back gear shaft, branch transmissions extending from the intermediate shaft to the back gear shaft, said transmissions being of different speed ratios, a common reverser for said transmissions, a shiftable clutch on the back gear shaft for coupling either transmission thereto, different speed ratio gearing coupling the back gear shaft to the spindle, one of said gears being shiftable, hydraulically actuated means for shifting all of said movable members, a selector valve for controlling the admission of pressure to said means and means to selectively position the selector valve to thereby determine the speed of the spindle in either direction of rotation thereof.

10. A transmission for the cutter spindle of a milling machine including a first shaft, a prime mover, means to selectively actuate said shaft at a definite number of selected speed rates by the prime mover, a back gear shaft, means coupling the back gear shaft to the spindle, means to effect rotation of the back gear shaft by the first shaft at two different series of speeds and in opposite directions including an idler shaft, a gear couplet fixed to said shaft, an additional gear fixed to said shaft, a pair of back gears mounted for free rotation on the back gear shaft, one of which meshes with said additional gear, the other with a gear of said couplet, the pairs of intermeshing gears being of different speed ratio, a shiftable gear mounted on the first shaft and movable for direct meshing with one of said back gears to effect rotation of the back gears in one direction or movable into mesh with a gear of said couplet to effect rotation of the back gears in the opposite direction, and means to couple either back gear to its shaft for determining the series of speeds at which the spindle is to be rotated.

11. In a transmission the combination with a final driven member of a back gear shaft journaled at opposite ends in parallel relation to said member, an intermediate bearing for the back gear shaft, means between said bearing and one end of the shaft for actuation thereof at a plurality of speeds, a pair of gears fixed to the final driven member, a drive gear mounted for free rotation on said shaft in constant mesh with one of said gears on the final driven member, said drive gear having a hub by which it is journaled in said intermediate bearing, an internal gear integral with said hub, a shiftable gear splined on the back gear shaft between the intermediate bearing and the other end of the shaft, and means to mesh selectively the shiftable gear with the internal gear for actuation of the final driven member at one series of rates and with the other gear on the final driven member for actuation thereof at a second series of rates.

12. A milling machine having a movable member, a prime mover, a variable speed transmission coupling the prime mover to the member including a plurality of shiftable gears, hydraulically actuated means for shifting said gears, a source of pressure, a rotatable selector valve interposed between the pressure and said means for determining the members to be shifted, means to connect the valve to the prime mover to selectively position the same, means to automatically disconnect pressure from the valve during said positioning and means to connect automatically the valve to pressure and thereby effect the desired shift upon disconnection of said power means.

13. A milling machine having a movable member, a prime mover, a variable speed transmission coupling the prime mover to the member including a plurality of shiftable units, hydraulically actuated means for shifting said units, a source of pressure, a selector valve interposed between said pressure and said hydraulically actuated means, a branch transmission actuated by the prime mover, means to couple the selector valve to said branch transmission to effect power rotation thereof to select the gears to be shifted, and means for automatically shifting said gears after making said selection.

14. A milling machine having a spindle, a prime mover, a variable speed transmission coupled to the spindle, a starting clutch for coupling the prime mover to the transmission, a control valve, a source of pressure, an hydraulically actuated change speed mechanism associated with said transmission, a selector valve, pressure channels coupling the pressure to said control valve and said selector valve, a branch transmission constantly actuated by the prime mover, a clutch for coupling the selector valve to the branch transmission for power rotation thereof, hydraulically actuated interlock for maintaining the clutch in a disengaged position connected to said control valve, means to position the control valve upon disconnection of the starting clutch to release the pressure from said interlock, a relief valve in the selector valve channel, means to open the relief valve upon engagement of the selector valve power clutch to disconnect pressure from the selector valve during selective positioning thereof, and means to automatically connect the pressure to said selector valve upon release of its power clutch to effect power shifting of the members to effect the selected rate.

LESTER F. NENNINGER
FRED A. HASSMAN